(12) United States Patent
Hochapfel et al.

(10) Patent No.: US 8,454,042 B2
(45) Date of Patent: Jun. 4, 2013

(54) WHEEL SUSPENSION OF A MOTOR VEHICLE

(75) Inventors: Erik Hochapfel, Gudensberg (DE);
Tobias Ebbing, Hövelhof (DE);
Hendrik Reineke, Bad Driburg (DE);
Jürgen Von Der Kall, Paderborn (DE);
Aloys Schröder, Paderborn (DE);
Rodscha Drabon, Salzkotten (DE);
Christian Schnabel, Paderborn (DE);
Armin Zuber, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 13/276,691

(22) Filed: Oct. 19, 2011

(65) Prior Publication Data

US 2012/0098229 A1 Apr. 26, 2012

(30) Foreign Application Priority Data

Oct. 20, 2010 (DE) .......................... 10 2010 060 093

(51) Int. Cl.
*B60G 11/08* (2006.01)
(52) U.S. Cl.
USPC ............................. 280/124.17; 280/124.171
(58) Field of Classification Search
USPC ........ 280/124.17, 124.171, 124.175, 124.177
See application file for complete search history.

(56) References Cited

U.S. PATENT DOCUMENTS

| 4,623,133 | A | * | 11/1986 | Davis et al. ..................... 267/53 |
| 4,768,807 | A | | 9/1988 | McGibbon et al. |
| 5,141,209 | A | | 8/1992 | Sano et al. |
| 5,950,971 | A | * | 9/1999 | Koumbis et al. .............. 248/200 |
| 6,189,904 | B1 | | 2/2001 | Gentry et al. |
| 7,017,888 | B2 | * | 3/2006 | Platner et al. ................ 267/36.1 |

FOREIGN PATENT DOCUMENTS

| DE | 937 391 | 1/1956 |
| DE | 42 01 180 | 7/1992 |
| EP | 1 645 445 | 4/2006 |

OTHER PUBLICATIONS

German Office Action dated Jul. 11, 2011 issued by the GPTO for DE 10 2010 060 093.8; 28423DE.

* cited by examiner

*Primary Examiner* — Faye M. Fleming
(74) *Attorney, Agent, or Firm* — Barnes & Thornburg LLP (57) ABSTRACT

A wheel suspension of a motor vehicle includes a transverse leaf spring arranged along a transverse axis of the motor vehicle. The transverse leaf spring is connected via two bearings with a body of the vehicle and is connected in an articulated manner at its two mutually opposite ends with a stub axle or suspension arm. The bearings are arranged such that the transverse leaf spring is stiffly fixed in a direction of a vertical axis of the vehicle and is movable in a translatory manner in a direction of the transverse axis of the vehicle and is rotationally movable around an axis that is parallel to a longitudinal axis of the vehicle.

10 Claims, 6 Drawing Sheets

WHEEL SUSPENSION OF A MOTOR VEHICLE

This application claims priority to German Patent Application No. 10 2010 060 093.8, filed Oct. 20, 2010, the content of which Applications are incorporated by reference herein.

BACKGROUND AND SUMMARY

The present disclosure relates to a wheel suspension of a motor vehicle. The wheel suspension includes a transverse leaf spring arranged along a transverse axis of a motor vehicle and which transverse leaf spring is connected via two bearings with a body of the vehicle and connected in an articulated manner at its two mutually opposite ends with a stub axle or a suspension arm.

Coiled steel springs are mainly used in car manufacturing for suspending the car body. These steel springs are usually arranged close to the wheel irrespective of the configuration of the axle. In order to reduce rolling motions of the vehicle body, anti-roll bars made of steel are mostly used between the suspension points of an axle. Transverse leaf springs are also used for the suspension of the car body as an alternative to the steel springs, which leaf springs are mostly made of fiber-reinforced materials in their current configuration.

A high rolling spring rate is important for commanding a motor vehicle especially when negotiating curves, which rolling spring rate counteracts excessive rolling motions of the body of the motor vehicle. Another important aspect is the highest possible value of the ratio of the rolling spring rate to the lifting spring rate of a wheel of a motor vehicle, which can only be achieved by the installation of an anti-roll bar in the currently known system for suspending motions of the car body, which has a disadvantageous effect on the weight of the car body suspension system.

The present disclosure relates to a weight-reduced wheel suspension in which the function of the anti-roll bar can be integrated in the transverse leaf spring.

This present disclosure more particularly relates to a wheel suspension of a motor vehicle including a transverse leaf spring arranged along a transverse axis of the motor vehicle and which transverse leaf spring is connected via two bearings with a body of the vehicle and connected in an articulated manner at its two mutually opposite ends with a stub axle or suspension arm. The bearings are arranged such that the transverse leaf spring is stiffly fixed in a direction of a vertical axis of the vehicle and is movable in a translatory manner in a direction of the transverse axis of the vehicle and is rotationally movable around an axis that is parallel to a longitudinal axis of the vehicle.

The bearings are arranged in the wheel suspension in accordance with the present disclosure. As noted above, the suspension system includes a transverse leaf spring which is arranged along a transverse axis of the motor vehicle and which is connected via at least two bearings with a vehicle body and at its respective mutually opposite ends in an articulated manner with a stub axle or suspension arm in such a way that the transverse leaf spring is fixed in a relatively stiff way in the direction of the vertical axis of the vehicle, but is movable at the same time in the direction of the transverse axis of the vehicle in a translatory manner and in a rotationally soft manner around an axis directed parallel to the longitudinal axis of the vehicle. The translatory mobility of the transverse leaf spring in the direction of the transverse axis of the vehicle allows reducing the distance of the transverse leaf spring when deflected.

The transverse leaf spring can be mounted in such a way on the vehicle body by such bearings so that the ratio of a rolling spring rate to a lifting spring rate can be set to such a large value that an installation of an anti-roll bar for stabilizing the vehicle is unnecessary.

Advantageous embodiments, according to the present disclosure, are discussed further herein.

In accordance with an embodiment of the present disclosure, the bearing includes two holders which are fixed to the vehicle body and are filled with an elastic material. The embodiment also includes a guide part which encases the transverse leaf spring and which is rotatably held on the holders about an axis directed approximately parallel to the longitudinal axis of the vehicle by bolts extending in the direction of the longitudinal axis of the vehicle out of the guide part. The bolts are movably mounted in the holders in a plane perpendicularly to the vertical axis of the vehicle.

The rotating ability of the bearing outside of the transverse leaf spring is realized thereby. The bearing is fixed to the vehicle body in such a way that the transverse leaf spring is capable of rotating with the bearing around an axis directed parallel to the longitudinal axis of the vehicle, depending on the rolling motion of the vehicle body and still ensuring a vertical fixing of the transverse leaf spring.

According to an embodiment of the present disclosure, the bearing includes two clamping parts which encase the transverse leaf spring and are enclosed at least in part by an elastic material. One of the clamping parts is arranged between the vehicle body and the transverse leaf spring and the other clamping part is located between the transverse leaf spring and a bracket engaging around the transverse leaf spring and the clamping parts on three sides and is fixable to the vehicle body. The transverse leaf spring may also be mounted with a bearing arranged in such a way that it has freedoms of mobility in the bearing as noted above.

In accordance with an embodiment of the present disclosure, one of the two clamping parts includes two metal or plastic plates which are encased with the elastic material and are disposed parallel with respect to each other and to the broadside of the transverse leaf spring. One of the metal or plastic plates is provided with a deflection or bulging which is convex centrally to the other metal or plastic plates in the direction of the longitudinal axis of the transverse leaf spring. The metal or plastic plates arranged in this manner ensure a roll-off kind of behavior of the transverse leaf spring when the transverse leaf spring is deflected, on the one hand, and this surface pressing is reduced to a level permissible for the transverse leaf spring on the other hand.

An elliptical solid core is embedded, according to an embodiment of the present disclosure, between the plastic or metal plates, which solid core is encased with the elastic material and with which the rotational movement of the transverse leaf spring around the axis directed parallel to the longitudinal axis of the vehicle is enabled. Moreover, a displacement of the transverse leaf spring in the direction of its longitudinal axis is facilitated by this configuration because two further sliding planes may be introduced into the bearing by the solid core.

In accordance with an embodiment of the present disclosure, the bearing is actively rotationally movable around an axis directed parallel to the longitudinal axis of the vehicle. This can occur, for example, in form of an electromotive triggering of the bearing, thereby enabling an active control of the car body suspension.

Other aspects of the present disclosure will become apparent from the following descriptions when considered in conjunction with the accompanying drawings.

DETAILED DESCRIPTION

In the following description, the terms such as top, bottom, left, right, front, back, etc relate to the exemplary illustrations as shown in the respective drawings and the position of the wheel suspension, the bearing and the other elements according to the present disclosure. These terms shall not be understood as limiting, which means that these references can change through various working positions or a mirror-symmetric configuration.

FIGS. 1 to 4 show a wheel suspension on a vehicle body 1, including a stub axle 9 and suspension arms 4, 6. The wheel suspension may be a rear-axle suspension on which two or more rotatable wheels (not shown) are arranged. A transverse leaf spring 2 is arranged as the main spring of the wheel suspension.

This transverse leaf spring 2 may include a light composite material, for example, glass-fiber reinforced plastic.

The linkage of the transverse leaf spring 2 to the vehicle body 1, or an auxiliary frame, occurs by way of at least two bearings 3 (FIGS. 1 to 3) and 8 (FIGS. 4 to 6) which are fixed at a predetermined distance from one another to the vehicle body 1. FIGS. 1 to 4 only show a left or right wheel suspension with only one respective bearing 3, 8.

Figure 1:
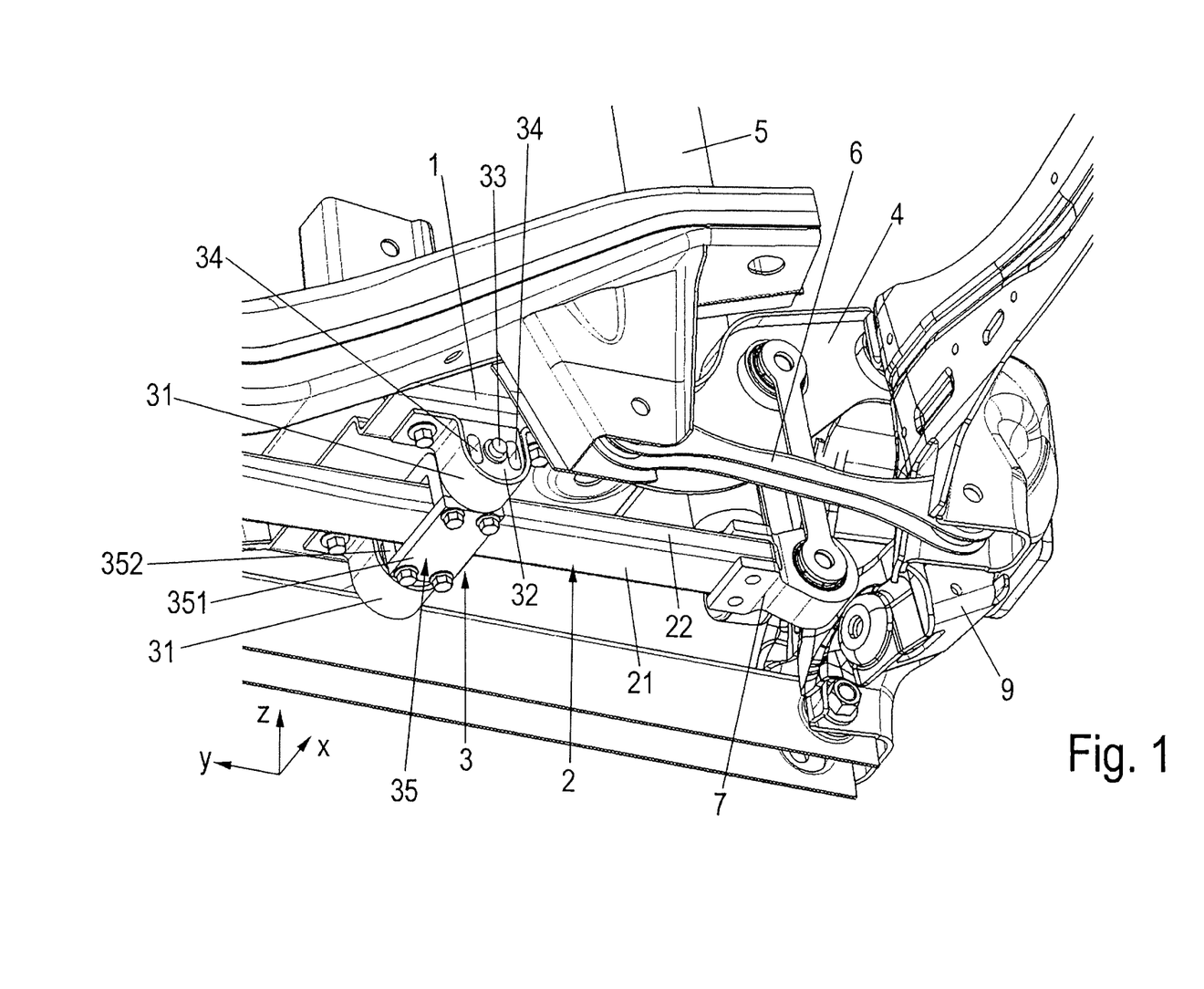
FIGS. 1 to 3 show perspective views of a first embodiment of a configuration of a wheel suspension, in accordance with the present disclosure.
Figure 2:
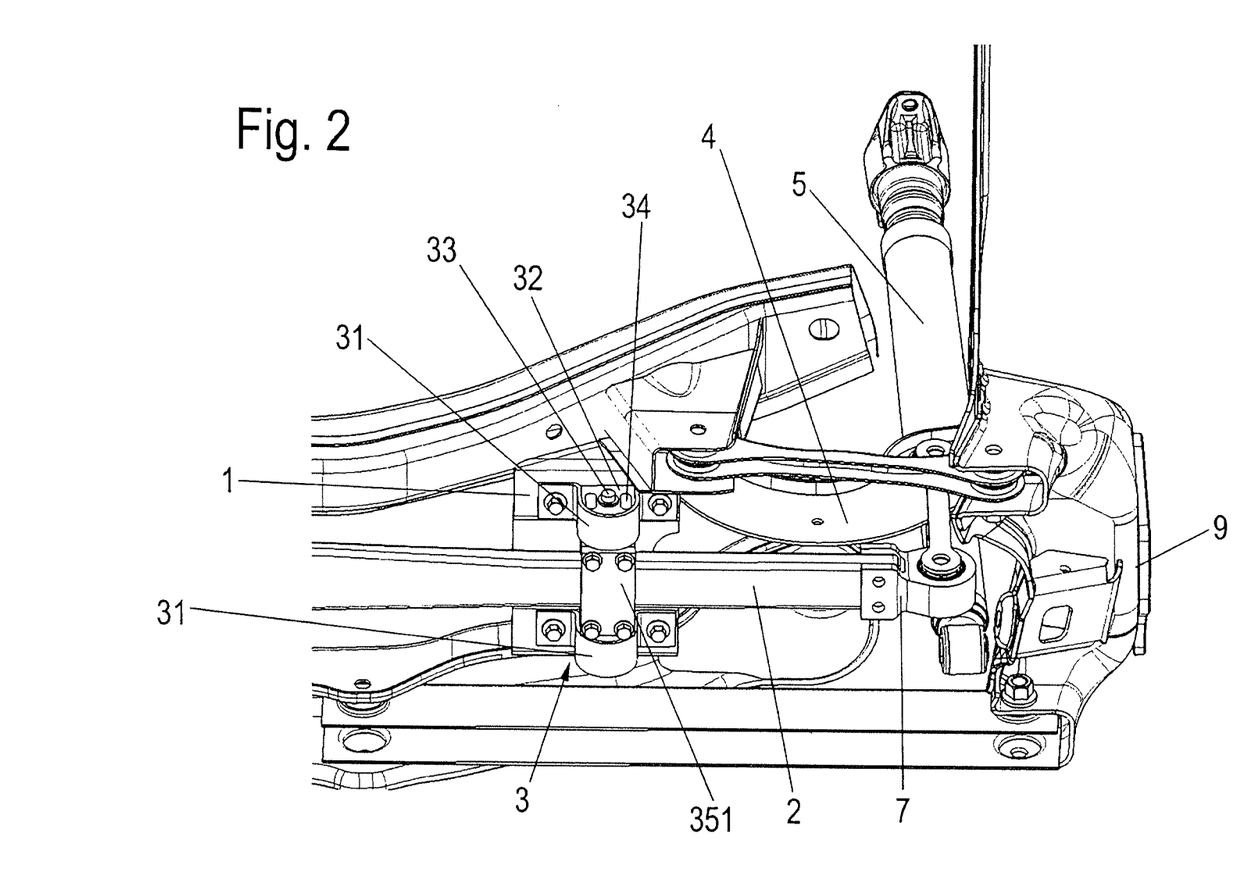
Figure 3:
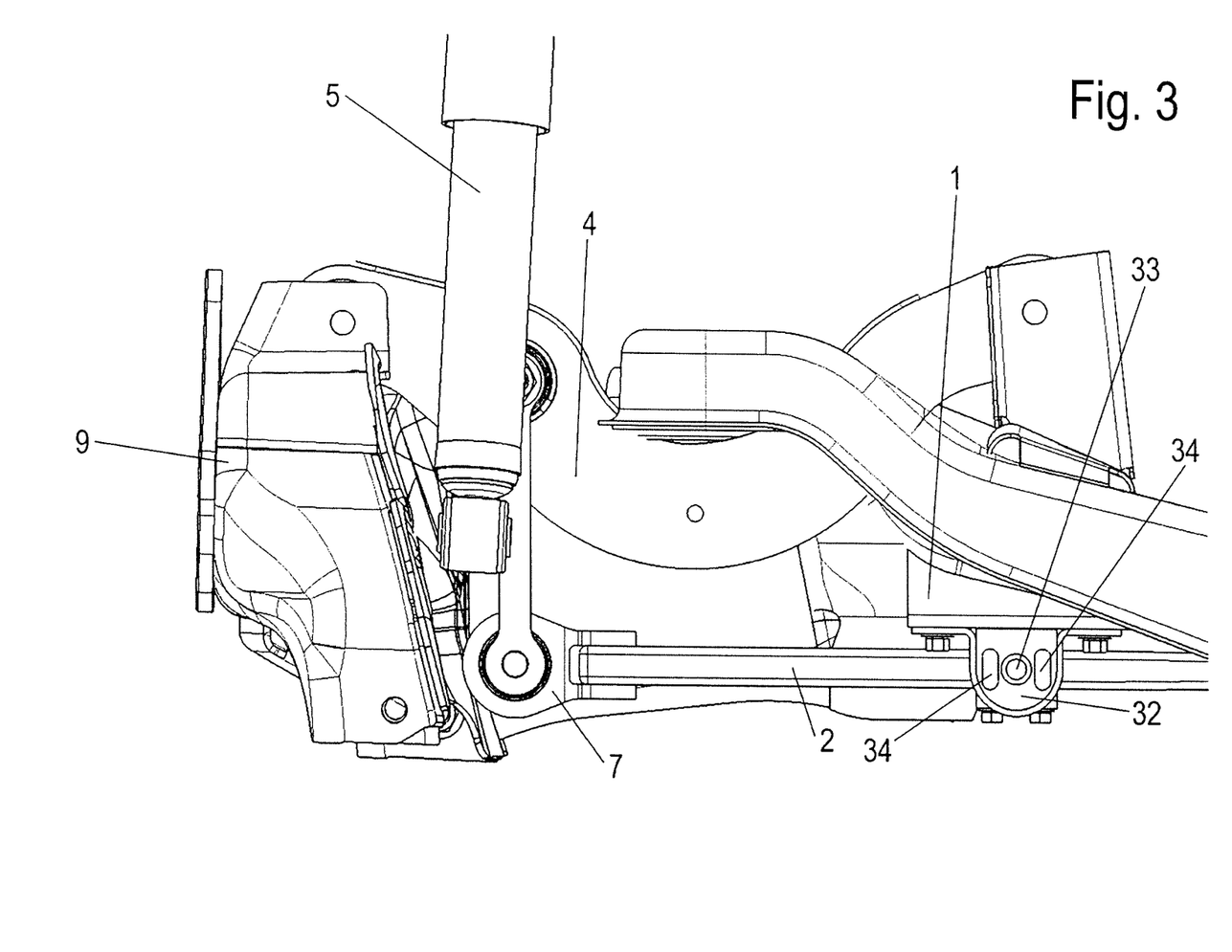
Figure 4:
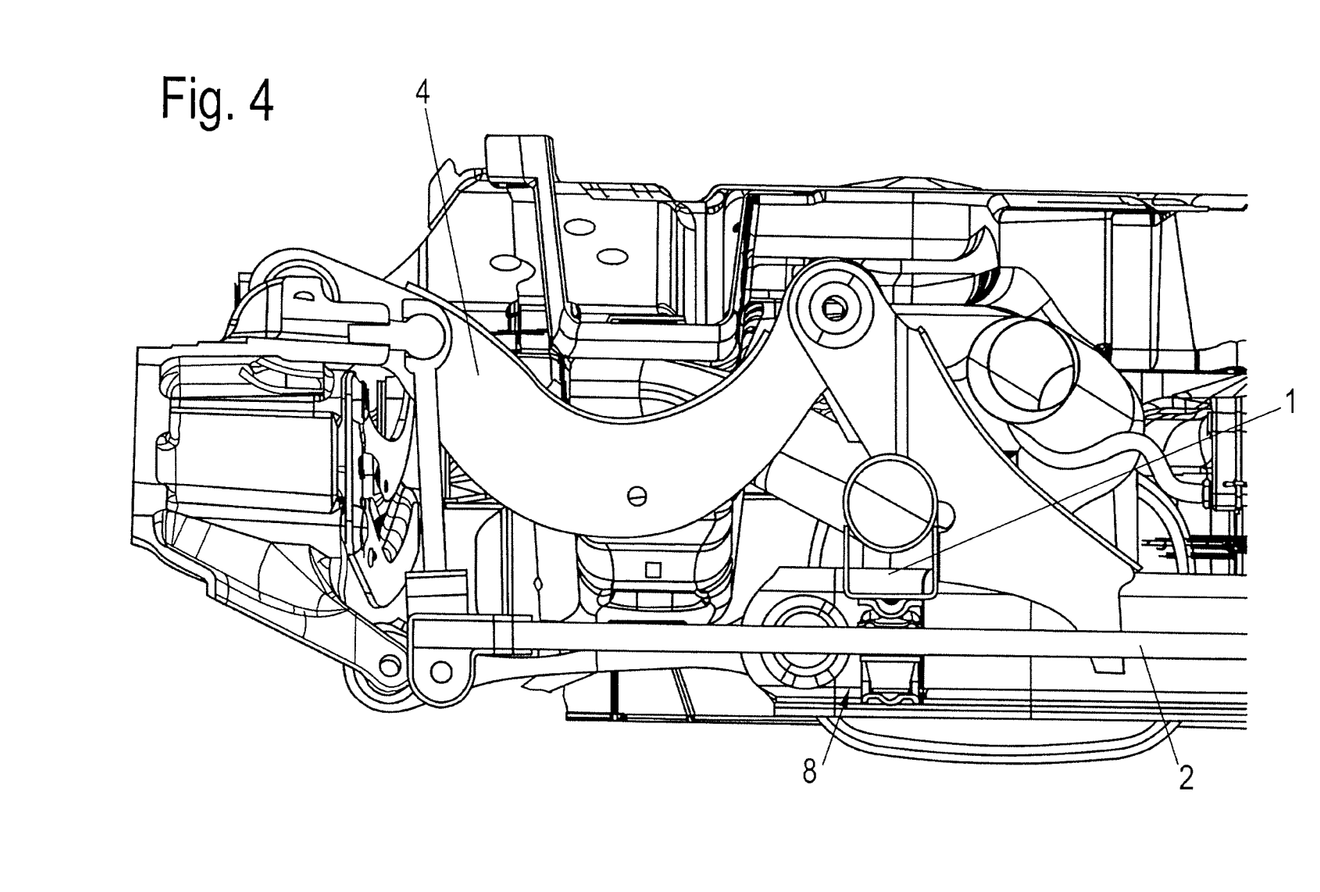
FIG. 4 shows a sectional view in the YZ-plane illustrating a second embodiment of wheel suspension, in accordance with the present disclosure.

In a first embodiment of the wheel suspension, as shown in FIGS. 1 to 3, the bearing 3 includes two holders 31 which are fixed to the vehicle body 1 by screws, for example, which holders 31 are arranged as U-shaped brackets, for example, with the open ends of the brackets being bent to the outside and thereby form a plane with or on which the holders 31 rest on the vehicle body 1 and are fixed with the screws. The U-shaped bulging of the holder 31 is filled with an elastic material 32, for example, a rubber mixture, in which centrally a borehole is provided through which a bolt 33 is inserted which is anchored in a guide part 35 that includes plate 351 and U-shaped bracket 352 and which guide part 35 embraces the transverse leaf spring 2. This is done so that the guide part 35 is rotatably mounted on the holders 31 around an axis directed approximately parallel to the longitudinal axis x of the vehicle by way of bolts 33 extending out of the guide part 35 in the direction of a longitudinal axis x of the vehicle. The bolts 33 extend perpendicularly to a narrow side 22 of the transverse leaf spring 2 through the holders 31 filled with the elastic material 32 on both sides of the narrow side 22 of the transverse leaf spring 2 and are thereby movably held in the holders 31 in a plane perpendicularly to the vertical axis z of the vehicle.

The elastic material 32 which fills the holders 31 can be arranged as solid rubber. Cavities 34 are provided in the embodiment as shown, which cavities 34 are disposed to the right and the left and adjacent to the bolts 33 protruding from the elastic material 32 as seen in the transverse direction y of the vehicle. By this, the resistance of the elastic material 32 against movements of the bolts 33 within the elastic material 32 is reduced in a plane formed by the transverse axis y of the vehicle in the longitudinal axis x of the vehicle.

The configuration of the bearing 3 also allows an active movement of the bearing 3 by an electric actuator (not shown) acting on the bearing 3, with which the bearing 3 can actively be rotated around an axis which is approximately parallel to the longitudinal axis x of the vehicle and thereby would allow active influence on the car body suspension 5.

Another embodiment of a bearing 8 is shown in FIGS. 4 to 7. The bearing 8 includes a bracket 81, for example, a metal bracket, which is bent in a U-shaped manner and which is outwardly bent at the open ends of the bracket 81 and comprises boreholes. Screws or other fastening means, for example, can be inserted through the boreholes and with which the bracket 81 can be fixed to the vehicle body 1. The bracket 81 encases the transverse leaf spring 2 from its bottom broad side 21 and the two narrow sides 22.

Figures 5, 6:
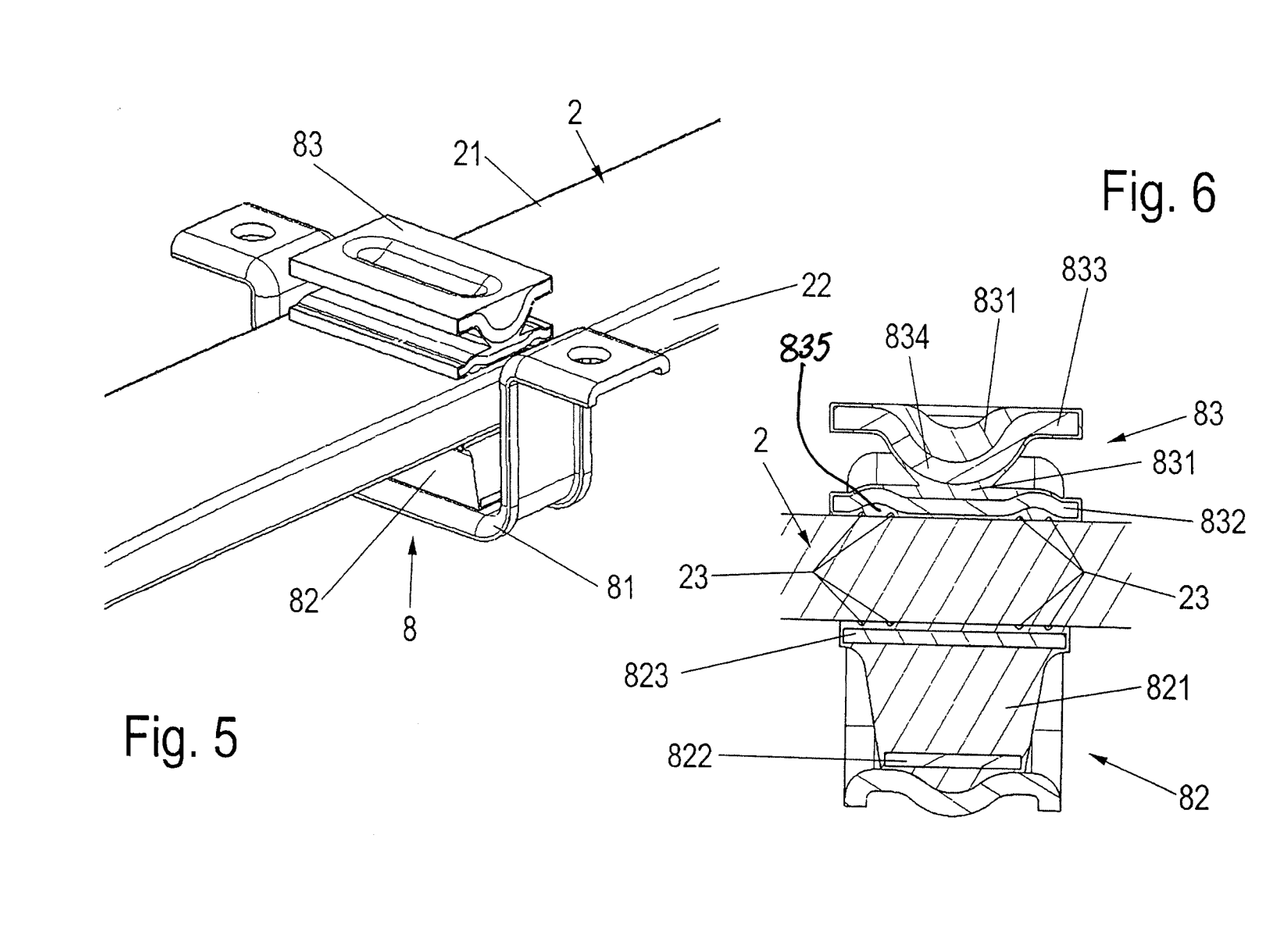
FIG. 5 shows a perspective view of the bearing shown in FIG. 4, including a more detailed view.
FIG. 6 shows a sectional view through the bearing of FIG. 4 and shown in the YZ-plane.

In order to realize a bearing of the transverse spring 2 with degrees of freedom as suggested or described above with the help of the bearing 8, a first clamping part 83, 83' is inserted between the vehicle body 1 and the upper broad side 21 of the transverse leaf spring 2. A second camping part 82, 82' is located between the bottom broad side 21 of the transverse leaf spring 2 and the bracket 81, with the two clamping parts 82, 83, 82', 83' being arranged, for example, as rubber-metal parts. The clamping part 82, which is shown in FIGS. 5 and 6, is disposed between the bracket 81 and the bottom side of the transverse spring 2. Damping part 82 includes two planar metal or plastic plates 822, 823 which are encased with an elastic material 821, for example, rubber, and are disposed parallel with respect to one another and to the broad side 21 of the transverse leaf spring 2.

The upper clamping part 83, which is disposed between the vehicle body 1 and the transverse leaf spring 2, substantially includes two metal or plastic plates 832, 833 which are encased with elastic material 831 and are disposed parallel with respect to each other and to the broadside 21 of the transverse leaf spring. One of the metal or plastic plates 833 is provided with a deflection 834 which is centrally convex to the other metal or plastic plate 832 in the direction of the longitudinal axis of the transverse leaf spring 2.

The convex deflection 834 allows a rotational movement of the transverse leaf spring 2 within the bearing 8 around the convex shaped metal or plastic plate 833. The transverse leaf spring 2 is stiffly fixed in the direction of the vertical axis z of the vehicle via the bracket 81 and the clamping parts 82, 83 are arranged between the bracket 81 and the transverse leaf spring 2 and between the transverse leaf spring 2 and the vehicle body 1, and movable in a translatory fashion in the plane opened up by the transverse axis y of the vehicle and the longitudinal axis x of the vehicle.

Figure 7:
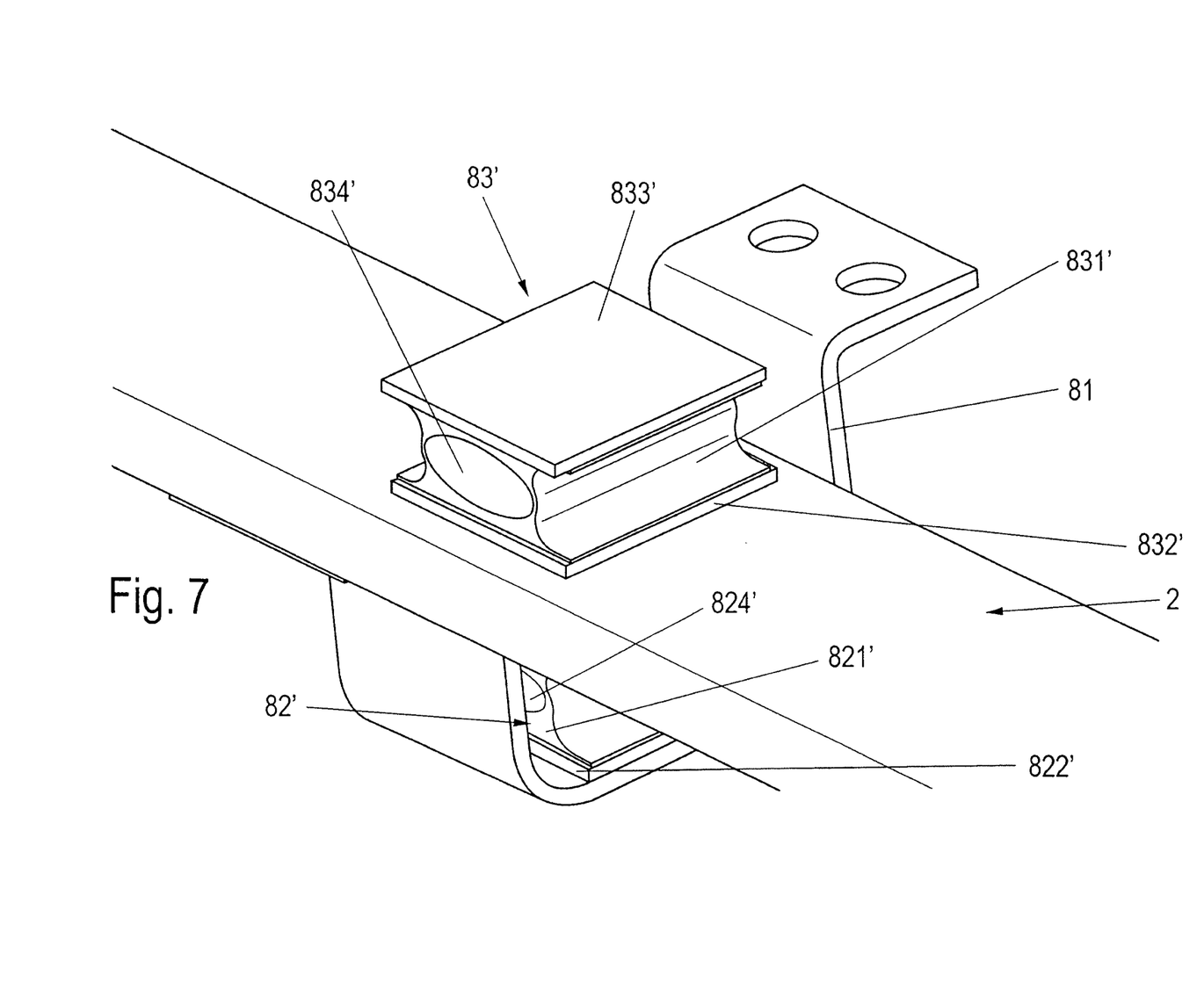
FIG. 7 shows a perspective view of an alternative embodiment of the bearing of FIG. 4 in a more detailed view with a bracket that is partly cut away.

In an embodiment as shown in FIG. 7, in which a part of the bracket 81 has been cut away for the purpose of improved illustration, an elliptical solid core 824', 834', each of which is encased with the elastic material 821', 831' and which are arranged as a solid metal or plastic core is embedded between the metal or plastic plates 822', 823' (not shown), 832', 833'. The rotational movement of the transverse leaf spring 2 around the axis directed parallel to the longitudinal axis x of the vehicle is enabled in a simple manner. Moreover, this configuration facilitates a displacement of the transverse leaf spring 2 in the direction of its longitudinal axis because two further sliding plates may be introduced into the bearing 8 by the solid core 824', 834'.

In order to fix the transverse leaf spring 2 in the bearing 8, the transverse leaf spring 2 and the clamping parts 82, 83 of the bearing 8 can be clamped in an interlocking fashion with one another in an embodiment according to the present disclosure. As is shown in FIG. 6, an interlocking clamping is achieved in such a way that the transverse leaf spring 2 includes at least one fin 23 which is aligned in the direction of the longitudinal axis x of the vehicle and which can be pressed into the elastic material 831 of the clamping part 82, 83. A further improved fixing is achieved in such a way that the elastic material 821, 831 of the clamping part 82, 83 includes at least one groove 835 accommodating the fin 23 of the transverse leaf spring 2 in order to thereby securely fix the transverse leaf spring 2 in the bearing 8.

The bearings 3 and 8, which are arranged in a manner described above, ensure that the ratio of the rolling spring stiffness to the lifting spring stiffness of the wheel suspension has a value of larger than 1.5. The additional installation of a stabilizer for stabilizing the wheel suspension, especially during rolling motions of the vehicle, is no longer necessary as a result of this.

Depending on the choice of the elastic material 821, 831, the stiffness of the bearing 3, 8 can be set differently as required. It is within the scope of the present disclosure that, with the wheel suspension in the manner as described above, to bring the ratio of the rolling stiffness to the lifting spring stiffness of the wheel suspension to a value of up to 2.2 without installing an additional stabilizer.

The transverse leaf spring 2 can, within the scope of the present disclosure, be linked, as shown in FIG. 1, at its end, for example, to a suspension arm, such as transverse link 4, by using a ball-and-socket joint 7, so that the transverse leaf spring 2 is fixed with the lowest possible rotational stiffness to the transverse link 4.

Although the present disclosure has been described and illustrated in detail, it is to be clearly understood that this is done by way of illustration and example only and is not to be taken by way of limitation. The scope of the present disclosure is to be limited only by the terms of the appended claims.

We claim:

1. A wheel suspension of a motor vehicle comprising:
   a transverse leaf spring arranged along a transverse axis of the motor vehicle and which transverse leaf spring is connected via two bearings with a body of the vehicle and connected in an articulated manner at its two mutually opposite ends with a stub axle or suspension arm;
   wherein the bearings are arranged such that the transverse leaf spring is stiffly fixed in a direction of a vertical axis of the vehicle and is movable in a translatory manner in a direction of the transverse axis of the vehicle and is rotationally movable around an axis that is parallel to a longitudinal axis of the vehicle;
   wherein the bearings include two holders which are fixed to the vehicle body and are filled with an elastic material, and a guide part which encases the transverse leaf spring and which is rotatably mounted on the holders around an axis directed approximately parallel to the longitudinal axis of the vehicle via bolts extending out of the guide part in the direction of the longitudinal axis, with the bolts being movably held in the holders in a plane perpendicularly to the vertical axis of the vehicle; and
   wherein in the plane perpendicular to the vertical axis of the vehicle the elastic material includes a cavity adjacent to the bolts and configured to reduce resistance of the elastic material against movements of the bolts.

2. The wheel suspension according to claim 1, wherein the bearings are actively rotationally movable around an axis which is directed approximately parallel to the longitudinal axis of the vehicle.

3. The wheel suspension according to claim 1, wherein the bearings include a stiffness so that a ratio of a rolling spring stiffness to a lifting spring stiffness of the wheel suspension has a value of more than 1.5.

4. The wheel suspension according to claim 1, wherein with the transverse leaf spring being connected via the two bearings with the vehicle body, a distance of the bearings from one another is chosen in such a way that a ratio of a rolling spring stiffness to a lifting spring stiffness of the wheel suspension has a value of up to 2.2.

5. A wheel suspension of a motor vehicle comprising:
   a transverse leaf spring arranged along a transverse axis of the motor vehicle and which transverse leaf spring is connected via two bearings with a body of the vehicle and connected in an articulated manner at its two mutually opposite ends with a stub axle or suspension arm;
   wherein the bearings are arranged such that the transverse leaf spring is stiffly fixed in a direction of a vertical axis of the vehicle and is movable in a translatory manner in a direction of the transverse axis of the vehicle and is rotationally movable around an axis that is parallel to a longitudinal axis of the vehicle;
   wherein the bearings include two clamping parts which encase the transverse leaf spring, with one of the clamping parts being arranged between the vehicle body and the transverse leaf spring and the other of the clamping parts being arranged between the transverse leaf spring and a bracket which encases the transverse leaf spring and the clamping parts on three sides and which clamping parts are configured to be fixed to the vehicle body;
   wherein at least one of the two clamping parts includes two planar plates which are encased with an elastic material and are disposed parallel with respect to each other and to a broad side of the transverse leaf spring; and
   wherein an elliptical solid core which is encased with the elastic material, is embedded between the planar plates.

6. The wheel suspension according to claim 5, wherein the clamping parts are a combination of rubber and metal.

7. The wheel suspension according to claim 5, wherein the two planar plates are made of metal or plastic.

8. A wheel suspension of a motor vehicle comprising:
   a transverse leaf spring arranged along a transverse axis of the motor vehicle and which transverse leaf spring is connected via two bearings with a body of the vehicle and connected in an articulated manner at its two mutually opposite ends with a stub axle or suspension arm;
   wherein the bearings are arranged such that the transverse leaf spring is stiffly fixed in a direction of a vertical axis of the vehicle and is movable in a translatory manner in a direction of the transverse axis of the vehicle and is rotationally movable around an axis that is parallel to a longitudinal axis of the vehicle
   wherein the bearings include two clamping parts which encase the transverse leaf spring, with one of the clamping parts being arranged between the vehicle body and the transverse leaf spring and the other of the clamping parts being arranged between the transverse leaf spring and a bracket which encases the transverse leaf spring and the clamping parts on three sides and which clamping parts are configured to be fixed to the vehicle body;
   wherein at least one of the two clamping parts includes two planar plates which are encased with an elastic material and are disposed parallel with respect to each other and to a broad side of the transverse leaf spring; and wherein one of the two clamping parts includes two plates which are encased with the elastic material and are disposed parallel with respect to one another and to the broad side of the transverse leaf spring, with the one of the plates being provided with a deflection in the direction of the longitudinal axis of the transverse leaf spring, which deflection is convex centrally to the other plate.

9. A wheel suspension of a motor vehicle comprising:

a transverse leaf spring arranged along a transverse axis of the motor vehicle and which transverse leaf spring is connected via two bearings with a body of the vehicle and connected in an articulated manner at its two mutually opposite ends with a stub axle or suspension arm;

wherein the bearings are arranged such that the transverse leaf spring is stiffly fixed in a direction of a vertical axis of the vehicle and is movable in a translatory manner in a direction of the transverse axis of the vehicle and is rotationally movable around an axis that is parallel to a longitudinal axis of the vehicle;

wherein the bearings include two clamping parts which encase the transverse leaf spring, with one of the clamping parts being arranged between the vehicle body and the transverse leaf spring and the other of the clamping parts being arranged between the transverse leaf spring and a bracket which encases the transverse leaf spring and the clamping parts on three sides and which clamping parts are configured to be fixed to the vehicle body;

wherein at least one of the two clamping parts includes two planar plates which are encased with an elastic material and are disposed parallel with respect to each other and to a broad side of the transverse leaf spring;

wherein the transverse leaf spring and the clamping parts are configured to be clamped onto each other in an interlocking manner; and wherein the transverse leaf spring includes at least one fin aligned in the direction of the longitudinal axis of the vehicle, which fin is configured to be pressed into the elastic material of the clamping parts.

10. The wheel suspension according to claim 9, wherein the elastic material of the clamping parts includes a groove configured to accommodate the fin of the transverse leaf spring.

* * * * *